(12) United States Patent
Schairer

(10) Patent No.: US 11,185,934 B2
(45) Date of Patent: Nov. 30, 2021

(54) CONICAL COUNTERSINK

(71) Applicant: GUEHRING KG, Albstadt (DE)

(72) Inventor: Stefan Schairer, Albstadt (DE)

(73) Assignee: Guehring KG, Albstadt (DE)

( * ) Notice: Subject to any disclaimer, the term of this patent is extended or adjusted under 35 U.S.C. 154(b) by 49 days.

(21) Appl. No.: 16/524,362

(22) Filed: Jul. 29, 2019

(65) Prior Publication Data

US 2020/0038968 A1 Feb. 6, 2020

Related U.S. Application Data

(63) Continuation of application No. PCT/EP2018/054239, filed on Feb. 21, 2018.

(30) Foreign Application Priority Data

Feb. 24, 2017 (DE) .......................... 102017203021.6
Aug. 22, 2017 (DE) .......................... 102017214622.2

(51) Int. Cl.
B23B 51/10 (2006.01)
B23B 51/00 (2006.01)

(52) U.S. Cl.
CPC .......... B23B 51/10 (2013.01); *B23B 51/0081* (2013.01); *B23B 2251/043* (2013.01); *B23B 2251/082* (2013.01)

(58) Field of Classification Search
CPC .............. B23B 51/10; B23B 2251/125; B23B 51/0081; B23B 2251/043; B23B 2251/082

See application file for complete search history.

(56) References Cited

U.S. PATENT DOCUMENTS

| 1,267,704 | A |   | 5/1918  | Skrukrud |
|-----------|---|---|---------|----------|
| 2,317,615 | A | * | 4/1943  | Johnson ................ B23B 51/104 408/202 |
| 2,359,859 | A | * | 10/1944 | Jarvis .................... B23B 51/104 408/112 |
| 4,032,251 | A |   | 6/1977  | Ribich |
| 4,293,254 | A | * | 10/1981 | Markovics ............. B23B 51/10 407/40 |
| 4,591,302 | A | * | 5/1986  | Lovendahl ............. B23B 51/10 407/104 |
| 5,030,040 | A | * | 7/1991  | Wood .................... B23B 51/107 408/59 |
| 2009/0041554 | A1 | * | 2/2009 | Liu ....................... B23B 51/101 408/225 |

FOREIGN PATENT DOCUMENTS

| DE | 19730377 A1 * | 1/1999 | ............. B23B 51/10 |
| DE | 10 2005 055 579 A1 | 4/2006 | |
| DE | 102005055579 A1 * | 4/2006 | ............. B23B 51/10 |
| DE | 10 2010 005 580 A1 | 7/2011 | |
| DE | 102016205040 A1 * | 9/2017 | ............. B23B 51/10 |
| EP | 1 481 648 A1 | 12/2004 | |
| WO | 2015/075127 A1 | 5/2015 | |

OTHER PUBLICATIONS

International Search Report (and English translation) from a corresponding international patent application (PCT/EP2018/054239) dated May 25, 2018, 4 pages.

* cited by examiner

*Primary Examiner* — Eric A. Gates
(74) *Attorney, Agent, or Firm* — Burr & Brown, PLLC

(57) ABSTRACT

The invention relates to a conical countersink (10) having at least one main cutting edge (16-1, 16-2, 16-3) extending in an arc-shaped, in particular spiral-shaped manner.

21 Claims, 4 Drawing Sheets

CONICAL COUNTERSINK

The invention relates to a conical countersink having a single or multiple cutting edges.

The structure and operating mode of a conical countersink are fundamentally known to the person skilled in the art, e.g. from DIN 335:2007-12. Conical countersinks usually have a clamping shaft and a cutting head with a conical cutting tip carried by the clamping shaft, in which one or more main cutting edges lies on a virtual cone surface with an axis of rotation of the conical countersink as the cone axis. The cone or tip angle of the cutting head usually lies at 90° (e.g. for countersunk screws). In addition, conical countersinks having a 60° tip angle (for deburring), a 75° tip angle (for rivet head counterbores), 120° tip angle (for sheet metal rivet counterbores) or the like are known.

In order to achieve a high smooth running during countersinking, several main cutting edges can be arranged with an unequal angle distribution about the axis of rotation. Thus, for example a triple-cutting edge conical countersink is known from WO 2015/075127 A1 in which the main cutting edges are arranged in the direction of rotation of the conical countersink with an unequal distribution. Due to the defined unequal distribution, a reduction in the vibrations and as a result, an improvement in the surface quality of the counterbore should be achieved. A triple-cutting-edge conical countersink is also described in DE 10 2005 055 579 A1 in which a free surface adjoining the main cutting edge in the direction of rotation should be radially and axially relief ground in order to improve the cutting and running properties.

It is common to the known conical countersinks that each of the main cutting edges lying in a virtual cone surface runs rectilinearly from its central cutting-edge corner to its outer-circumferential-side cutting edge corner.

Starting from the known conical countersinks, it is now the object of the invention to provide a single- or multiple-cutting-edge conical countersink having an alternative main cutting edge geometry by means of which a high smooth running and tool lifetime is maintained during countersinking.

This object is solved by a conical countersink having the features of claim 1. Advantageous further developments are the subject matter of the dependent claims.

A conical countersink according to the invention can have a clamping shaft and a cutting head similarly to the known conical countersinks discussed initially or according to DIN 335:2007-12. The cutting head of the conical countersink according to the invention can be designed to have a single or multiple cutting edges. Each main cutting edge lies in a virtual cone plane with the axis of rotation of the conical countersink as cone axis. The opening or cone angle can, for example, be 60°, 75°, 90°, 120° etc. Furthermore, the cutting head and the clamping shaft can be made of one piece of material, e.g. from HSS steel.

A conical countersink according to the invention differs from the known conical countersinks in that it has at least one main cutting edge, which lying in the virtual cone plane, runs not rectilinearly but in an arc shape, in particular, in a spiral shape from its central cutting-edge corner (beginning) to its outer-circumferential-side cutting-edge corner (end). The at least one main cutting edge therefore turns about the axis of rotation or, in other words, has a twist about the axis of rotation.

As a result of the arc shape, the at least one main cutting edge has a greater cutting edge length than a rectilinearly running main cutting edge. The cutting force acting on the main cutting edge during the countersinking is therefore distributed over a greater intervention length, which results in a higher stability, a smoother running or a lesser tendency to rattling and less wear of the cutting edges.

The at least one main cutting edge can in principle have a twist contrary to or in the direction of rotation of the conical countersink. As a result of a twist in the direction of rotation (right-hand twist in the direction of rotation to the right or left-hand twist in the direction of rotation to the left), it is achieved that the at least one main cutting edge executes a pulling cut and acts in a peeling manner on the countersunk workpiece. Compared to a pushing cut which would be achieved with a main cutting edge running in an arc shape contrary to the direction of rotation or with a rectilinearly running main cutting edge, a pulling cut results in a smoother running.

The twist angle of the at least one main cutting edge measured in a side view with radial viewing direction at the outer-circumferential-side cutting edge corner with respect to the axis of rotation can lie in a range from 10° to 70°, in particular from 15° to 55°, preferably from 25° to 45°.

Furthermore, the at least one main cutting edge can run along an arc, which when seen in a front view, is defined by three points, i.e., the central cutting-edge corner, the outer circumferential-side cutting-edge corner and the centre point lying on half the cutting edge length, which has a radius in the range from 0.5 mm to 150 mm, in particular from 4 mm to 40 mm, preferably from 7 mm and 25 mm, for a cutting head diameter (Ø) in the range from 4.3 mm to 31 mm.

First test runs with angles of twist and arc radii lying in the aforesaid ranges have yielded good results with regard to smooth running during countersinking.

If the conical countersink has a plurality of main cutting edges, it is fundamentally sufficient if at least one of the several main cutting edges runs in an arc shape, in particular in a spiral shape. The aforementioned advantages can already be achieved as a result.

With a view to achieving a long lifetime and a smoother running, the conical countersink according to the invention preferably has a plurality of, in particular, three main cutting edges which are all configured to run in an arc shape, in particular in a spiral shape.

The plurality of main cutting edges can have the same or unequal arc radii and/or angles of twist. The same arc radii and/or angles of twist contribute towards a simpler grinding operation of the cutting head of the conical countersink. As a result of unequal arc radii and/or twist angles, unequal cutting edge lengths are achieved with the consequence of unequal cutting force and associated unequal stressing of the main cutting edges, which has a positive effect on the smooth running of the conical countersink.

Regardless of whether the arc radii and/or angles of twist are equal or unequal, the plurality of main cutting edges are preferably arranged about the axis of rotation so that at least the outer circumferential-side cutting-edge corners are arranged with the same angle distribution. Alternatively to this, the outer circumferential-side cutting-edge corners of the main cutting edges are arranged with an unequal angle distribution.

Furthermore, the plurality of main cutting edges can have the same or (defined) unequal cutting edge heights. When the cutting heights are the same, the main cutting edges can lie on a common virtual cone surface, which contributes to a simplification of the grinding operation of the cutting head of the conical countersink. (Defined) unequal cutting heights on the other hand, as a result of the unequal stressing of the main cutting edges, can contribute to a further reduction in the tendency to rattling and therefore to a smoother running of the conical countersink during countersinking.

In addition to the at least one main cutting edge running in an arc shape, the conical countersink can have at least one rectilinearly running cutting edge configured in a conventional manner. If the outer-circumferential-side cutting edge corners of the arcuate main cutting edges and the rectilinear cutting edges lie on the same radius with respect to the axis of rotation of the conical countersink, unequal cutting edge lengths are obtained with the consequence of unequal cutting edge forces and associated unequal stressing of the main cutting edges and cutting edges, which has a positive influence on the smooth running of the conical countersink.

If the conical countersink has a plurality of main cutting edges running in an arc shape and a plurality of cutting edges running rectilinearly, in particular an equal number of main cutting edges running in an arc shape and cutting edges running rectilinearly, it is advantageous if the arcuate main cutting edges and the rectilinear cutting edges are arranged alternately about the axis of rotation of the conical countersink. In this case, the outer-circumferential-side cutting edge corners of the arcuate main cutting edges and the rectilinear cutting edges are arranged with the same angle distribution, i.e. symmetrically about the axis of rotation of the conical countersink. As a result, the conical countersink is loaded symmetrically or uniformly about the circumference.

Two exemplary embodiments of a conical countersink according to the invention are described hereinafter with the aid of the appended drawings.

FIRST EMBODIMENT

FIGS. 1 to 5 show schematically a first embodiment of a conical countersink 10 according to the invention.

The conical countersink 10 has by analogy with DIN 335:2007-12 a clamping shaft 12 and a cutting head 14 adjoining the clamping shaft 12 in the tool feed direction along the axis of rotation 11. The clamping shaft 12 and the cutting head 14 are made of one piece of material and are fabricated from HSS steel.

Figure 4:
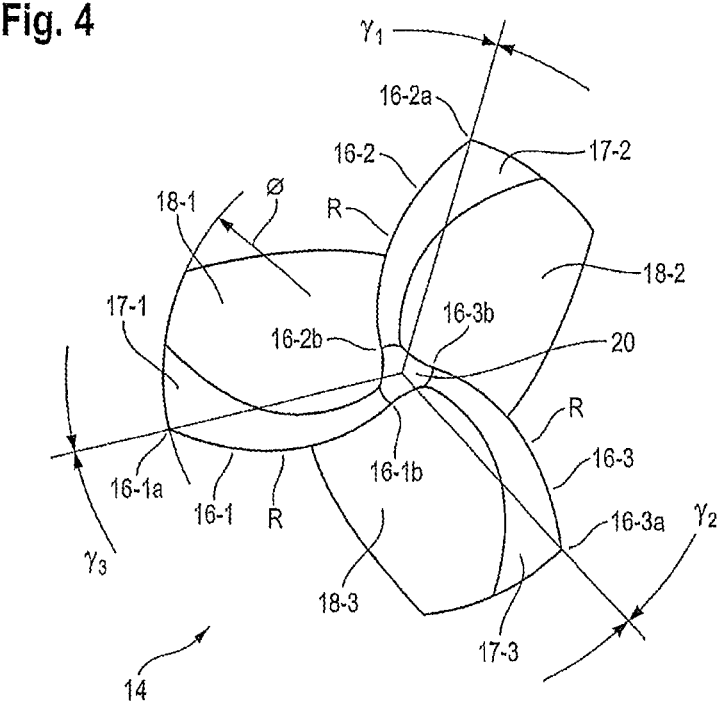
FIG. 4 shows a front view of the conical countersink according to the invention according to the first embodiment.

As the figures show, the conical countersink 10 is dextrorotary and has three cutting edges. The three main cutting edges 16-1, 16-2, 16-3 provided on the cutting head 14 are arranged around the axis of rotation 11 with a 120° division in the direction of rotation. FIG. 4 show the 120° pitch angle γ1, γ2, γ3 between the main cutting edges 16-1 and 16-2, 16-2 and 16-3 or 16-3 and 16-1. When viewed contrary to the direction of rotation, each main cutting edge 16-1, 16-2, 16-3 is adjoined by a main free surface 17-1, 17-2, 17-3, which is followed by a clamping groove 18-1, 18-2, 18-3. When viewed in the axial direction, each main cutting edge 16-1, 16-2, 16-3 at the outer-circumferential-side cutting-edge corner 16-1a, 16-2a, 16-3a goes over into an outer-circumferential-side auxiliary cutting edge 19-1, 19-2, 19-3 specified in FIG. 1, which is not of further importance for the invention.

The three main cutting edges 16-1, 16-2, 16-3 lie without (defined) cutting-edge height difference on a common virtual cone surface with the axis of rotation 11 as cone axis. The opening or cone angle $\alpha_1$ (cf, FIG. 3) of the cutting head 14 in the first embodiment is 90°.

Figure 1:
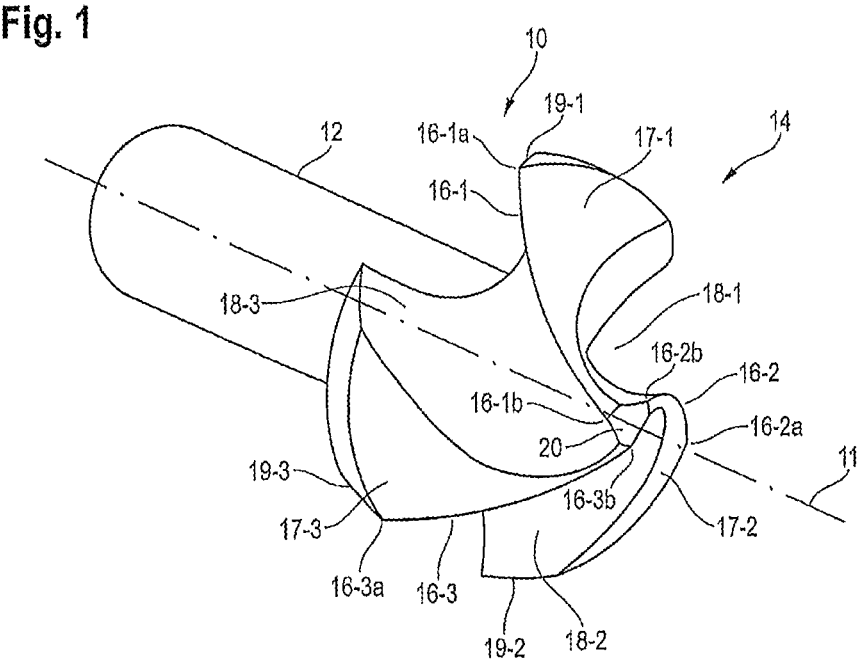
FIG. 1 shows a perspective view of a conical countersink according to the invention according to a first embodiment.
Figure 2:
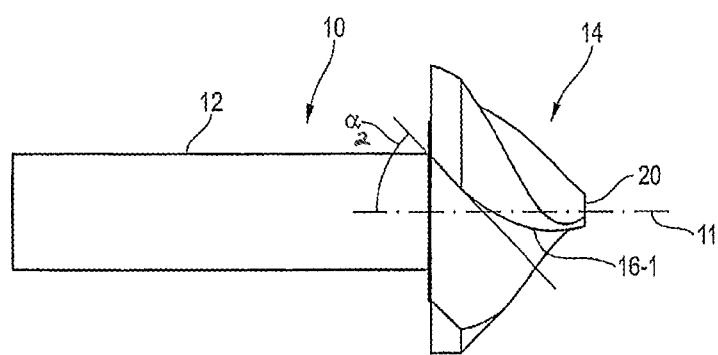
FIG. 2 shows a side view of the conical countersink according to the invention according to the first embodiment.
Figure 3:
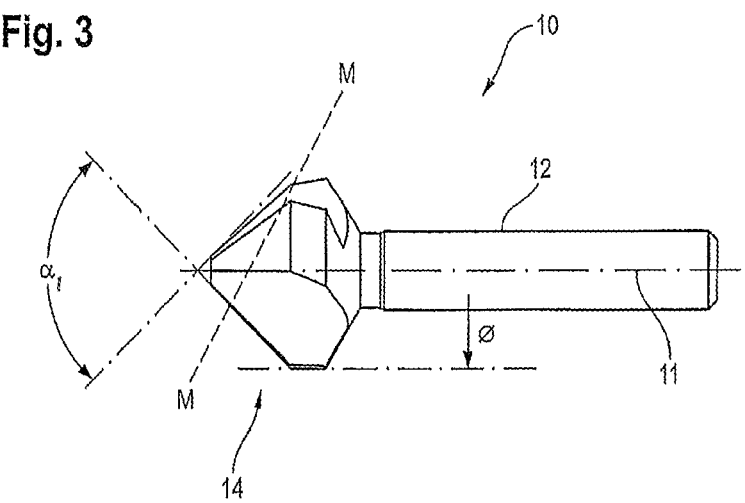
FIG. 3 shows a further side view of the conical countersink according to the invention according to the first embodiment.

As FIGS. 1 to 3 show, each of the three main cutting edges 16-1, 16-2, 16-3 runs from its inner-circumferential-side or central cutting-edge corner (beginning) 16-1b, 16-2b, 16-3b to its outer-circumferential-side cutting edge corner (end) 16-1a, 16-2a, 16-3a on the virtual cone surface with a right-hand twist in an arc shape, in particular in a spiral shape about the axis of rotation 11.

In the first embodiment the main cutting edges 16-1, 16-2, 16-3 are configured in the same shape. In the axial plan view or front view of FIG. 4, it can be seen that the main cutting edges 16-1, 16-2, 16-3 each run along an arc defined by three points, i.e. the central cutting edge corner 16-1b, 16-2b, 16-3b, the outer-circumferential-side cutting edge corner 16-1a, 16-2a, 16-3a and a centre point (not shown in FIG. 4) lying at half the cutting-edge length. In the first embodiment, the arc radii of the three main cutting edges 16-1, 16-2, 16-3 are the same size. In FIG. 4 the arc radii for the main cutting edge 16-1, 16-2, 16-3 is given by R. In FIG. 4 the maximum cutting-edge diameter of the cutting head 14 is given by "Ø" and according to DIN 335:2007-12 can be from 4.3 mm to 31 mm. The arc radii of the main cutting edges 16-1, 16-2, 16-3 can lie in a range from 0.5 mm to 150 mm, in particular from 4 mm to 40 mm, preferably from 7 mm to 25 mm. In the example shown in FIG. 4, the diameter Ø is for example 25 mm and the arc radii R of the main cutting edges 16-1, 16-2, 16-3 are, for example, 11 mm. Furthermore, the three main cutting edges 16-1, 16-2, 16-3 have the same spiral or twist angle. In FIG. 2 the twist angle "$\alpha_2$" measured in a side view in a radial viewing direction on an outer-circumferential-side cutting-edge corner with respect to the axis of rotation 11 is specified. According to the invention, the twist angle of the three main cutting edges 16-1, 16-2, 16-3 lies in a range from 10° to 70°, in particular from 15° to 55°, preferably from 25° to 45°. In the example shown in FIG. 2, the twist angle "$\alpha_2$" is, for example, 45°.

Figure 5:
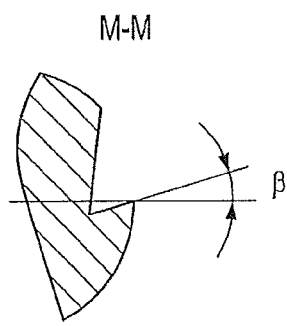
FIG. 5 shows a partial sectional view of the conical countersink according to the invention according to the first embodiment along the line M-M in FIG. 3.

In the conical countersink 10 according to the invention, the clamping angle of the three main cutting edges 16-1, 16-2, 16-3 each vary from the central cutting-edge corner 16-1b, 16-2b, 16-3b towards the outer-circumferential-side cutting edge corner 16-1a, 16-2a, 16-3a uniformly from zero or a negative amount in the centre to a positive amount on the outer circumference. In FIG. 5 the positive clamping angle measured on the outer-circumferential-side cutting edge corner of a main cutting edge is specified by "P", which for example is 25°.

With regard to all the other dimensional details not mentioned etc. the conical countersink 10 according to the invention can meet the specifications of DIN 335:2007-12.

FIGS. 1 to 4 shows the central cutting-edge corners 16-1b, 16-2b, 16-3b of the main cutting edges 16-1, 16-2, 16-3 in the axial direction at the same height and at the same radial distance from the axis of rotation 11. FIGS. 1 to 4 show a flattened tip 20 at the height of the central cutting-edge corners 16-1b, 16-2b, 16-3b. Similarly to this, the outer-circumferential-side cutting edge corners 16-1a, 16-2a, 16-3a lie at the same axial height and at the same radial distance from the axis of rotation 11.

As a result of the arc shape, each main cutting edge 16-1, 16-2, 16-3 has a greater cutting edge length than a rectilinearly running main cutting edge of a conventional conical countersink. As a result of the greater cutting-edge length, a smoother running and a higher stability are obtained during countersinking since the loads acting on the main cutting edges 16-1, 16-2, 16-3 are distributed over greater cutting-edge intervention lengths. Overall a lower wear and a lower tendency to rattling are obtained.

As a result of the twist in the direction of rotation, the main cutting edges 16-1, 16-2, 16-3 perform a pulling cut in the machined workpiece during the countersinking and have a peeling effect on the machined workpiece, which results in smooth running.

SECOND EMBODIMENT

Figure 6:
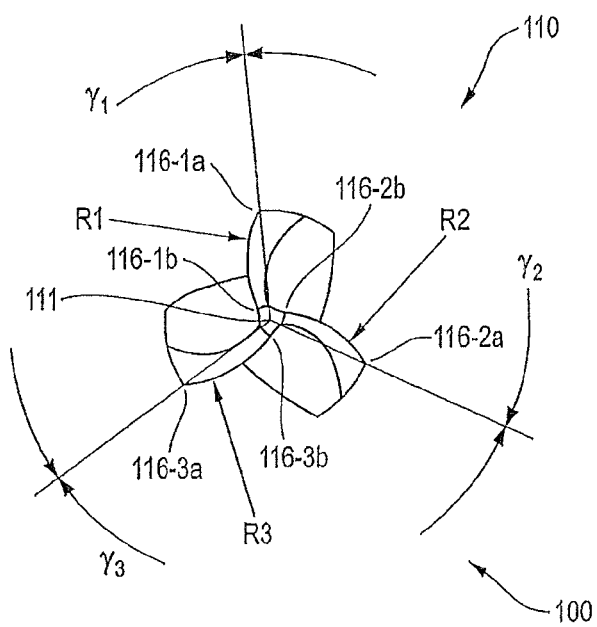
FIG. 6 shows a front view of the conical countersink according to the invention according to a second embodiment.
Figure 7:
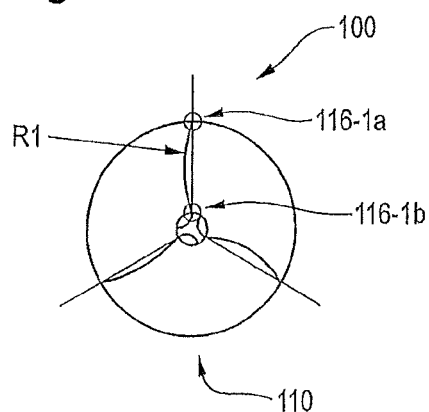
FIG. 7 shows a simplified front view of the conical countersink according to the invention according to the second embodiment to explain the arc radii of the main cutting edges.

FIGS. 6 and 7 show a second embodiment of a conical countersink 110 according to the invention. The conical countersink 110 of the second embodiment substantially only differs from the conical countersink 110 of the first embodiment in that the arc radii R1, R2, R3 of the three main cutting edges 116-1, 116-2, 116-3 are unequal.

Whereas in the case of the conical countersink of the first embodiment, the main cutting edges 16-1, 16-2, 16-3 are configured to be the same shape, in particular therefore have the same arc radii and cutting edge lengths, the main cutting edges 116-1, 116-2, 116-3 of the conical countersink 110 of the second embodiment have unequal arc radii which are specified in FIG. 6 by "R1", "R2" or "R3", wherein R1>R2>R2. In the example shown in FIG. 6, the arc radii R1, R2, R3 are 15 mm, 11 mm and 18 mm respectively. As a result of the unequal arc radii, the main cutting edges 116-1, 116-2, 116-3 necessarily also have unequal cutting edge lengths.

As in the first embodiment also in the conical countersink 110 of the second embodiment, the three main cutting edges 116-1, 116-2, 116-3 are arranged about the axis of rotation so that the outer-circumferential-side cutting-edge corners thereof 116-1a, 116-2a, 116-3a are arranged with the same angular division of 120° in each case about the axis of rotation 111. As a result of the unequal angular division of the central cutting edges 116-1b, 116-2b, 116-3b of the main cutting edges 116-1, 116-2, 116-3, this arrangement requires an unequal angular division of the central cutting-edge corners 116-1b, 116-2b, 116-3b of the three main cutting edges 116-1, 116-2, 116-3.

As a result of the unequal arc radii and the unequal cutting-edge lengths thus obtained, unequal cutting forces and unequal stresses of the main cutting edges are obtained during countersinking, which has a positive influence on the tendency to experience rattling of the conical countersink.

THIRD EMBODIMENT

Figure 8:
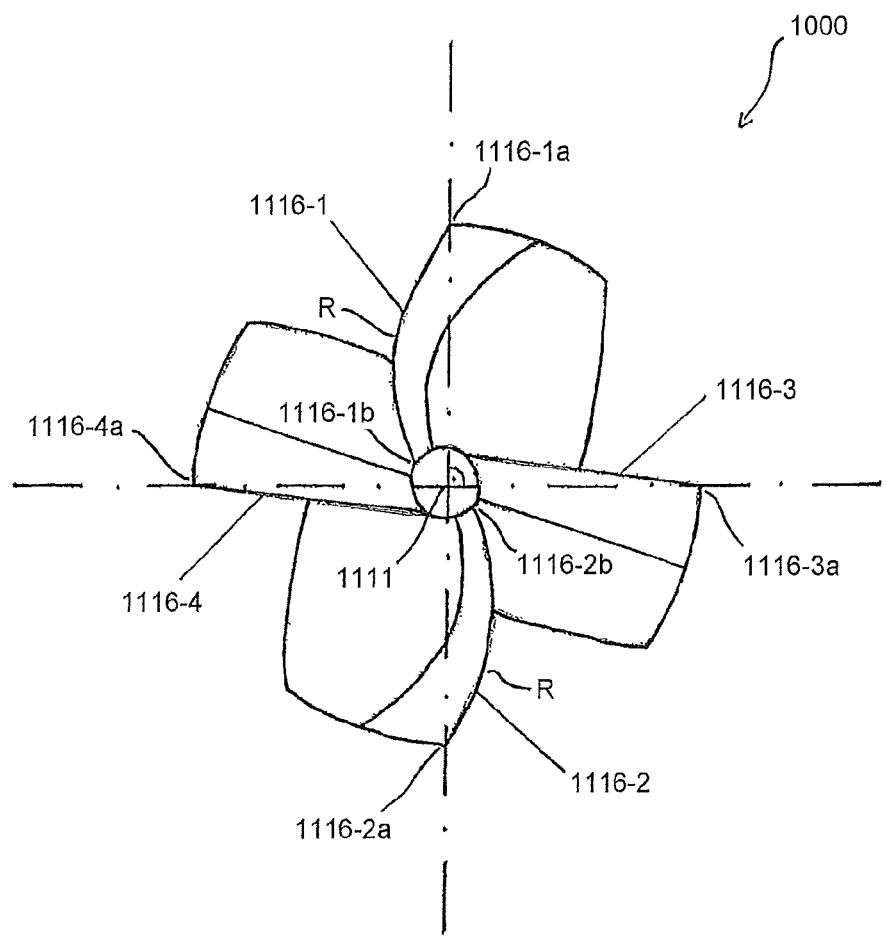
FIG. 8 shows a front view of the conical countersink according to the invention according to a third embodiment.

FIG. 8 shows a third embodiment of a conical countersink 1000 according to the invention. The conical countersink 1000 of the third embodiment differs from the conical countersink 10 of the first embodiment and the conical countersink 110 of the second embodiment in that in addition to the main cutting edges 1116-1, 1116-2 running in an arc shape, it also has rectilinear cutting edges 1116-3; 1116-4 configured in a conventional manner.

In FIG. 8 two arcuate main cutting edges 1116-1, 1116-2 having the same arc radii R and two rectilinear cutting edges 1116-3; 1116-4 are arranged alternately around the axis of rotation 1111. The outer-circumferential-side cutting-edge corners 1116-1a and 1116-2a of the arcuate main cutting edges 1116-1 and 1116-2 and the outer-circumferential-side cutting-edge corners 1116-3a and 1116-4a of the rectilinear cutting edges are in this case arranged with the same angular division of 90° in each case, i.e. symmetrically about the axis of rotation 1111.

MODIFICATIONS OF THE EMBODIMENTS

In the first to third embodiment, the clamping shaft and the cutting head are fabricated from HSS steel from one piece of material. The main and auxiliary cutting edges are ground into the cutting head. However, this is not absolutely necessary. The main and auxiliary cutting edges can alternatively be formed on cutting members, e.g. cutting plates or cutting inserts, which are held permanently securely on the cutting head as a base member, e.g. by soldering or adhesive bonding or exchangeably firmly, e.g. by screwing.

In the first to third embodiment, the conical countersink is designed to be dextrorotary. This is not absolutely essential. The conical countersink can alternatively also be designed as laevorotary.

Furthermore, the conical countersink of the first and second embodiment can have instead of three main cutting edges, two main cutting edges or more than three main cutting edges. In a multi-cutting-edge design, it can fundamentally be sufficient if at least one of the main cutting edges runs on the virtual cone surface in an arc shape, in particular in a spiral shape.

Furthermore, in a multi-cutting-edge design the main cutting edges of the conical countersink can fundamentally be configured with the same division, e.g. similar to the first and third embodiment or an unequal division, e.g. similar to the second embodiment on the cutting edge. Furthermore, the main cutting edges can be arranged without a defined cutting height difference, e.g. as in the first to third embodiments or with a defined cutting height difference of for example 0.05 mm between two successive main cutting edges in the direction of rotation.

The opening or cone angle of the cutting head can, unlike the first and second embodiment, also have 60°, 75°, 120° or any other amount.

In the first to third embodiment, the main cutting edges each have a twist in the direction of rotation. Alternatively to this, the direction of twist can be oriented contrary to the direction of rotation.

In the third embodiment, two arcuate main cutting edges and two rectilinear cutting edges are arranged alternately and with the same angular division about the axis of rotation of the conical countersink. In each case, however only one main cutting edge or one cutting edge or in each case more than two cutting edges or cutting edges are arranged about the axis of rotation. In this case, the angular division of the main cutting edges or cutting edges about the axis of rotation can also be asymmetrical. Furthermore, the number of arcuate main cutting edges and rectilinear cutting edges need not be the same size and the arc radii of the arcuate main cutting edges need not be the same size.

The invention claimed is:

1. A conical countersink comprising at least a first main cutting edge extending in an arc shape, the at least one main cutting edge extending from a central cutting edge corner to an outer-circumferential-side cutting-edge corner,
   a tangent of the first main cutting edge at the central cutting-edge corner defining a zero or negative clamping angle relative to a line segment extending from the central cutting-edge corner to the outer-circumferential-side cutting-edge corner,
   a tangent of the first main cutting edge at the outer-circumferential-side cutting-edge corner defining a positive clamping angle relative to a line segment extending from the central cutting-edge corner to the outer-circumferential-side cutting-edge corner.

2. The conical countersink according to claim 1, wherein the at least one main cutting edge runs in a spiral shape when viewed in an axial front view.

3. The conical countersink according to claim 1, wherein the at least one main cutting edge, measured in a side view with radial viewing direction at the outer circumferential-side cutting-edge corner with respect to the axis of rotation, has an angle of twist which lies in a range from 10° to 70°.

4. The conical countersink according to claim 1, wherein:
   a diameter of the conical countersink lies in the range from 4.3 mm to 31 mm and
   the at least one main cutting edge runs along an arc, which when seen in a front view, is defined by a central cutting-edge corner and an outer circumferential-side cutting-edge corner and has a radius in the range from 0.5 mm to 150 mm.

5. The conical countersink according to claim 1, wherein the conical countersink comprises a plurality of main cutting edges running in an arcuate shape.

6. The conical countersink according to claim 5, wherein arc radii of the main cutting edges are unequal.

7. The conical countersink according to claim 5, wherein outer circumferential-side cutting-edge corners of the main cutting edges are arranged with a same angle distribution about an axis of rotation.

8. The conical countersink according to claim 5, wherein the main cutting edges have a same or defined unequal cutting edge heights.

9. The conical countersink according to claim 1, wherein the conical countersink is fabricated in one piece of material from HSS steel.

10. The conical countersink according to claim 1, wherein the conical countersink comprises at least one rectilinearly running cutting edge.

11. The conical countersink according to claim 10, wherein the conical countersink comprises an equal number of main cutting edges running in an arc shape and cutting edges running rectilinearly.

12. The conical countersink according to claim 11, wherein the at least one main cutting edge running in an arc shape and the at least one cutting edge running rectilinearly are arranged alternately about the axis of rotation.

13. The conical countersink according to claim 1, wherein the at least one main cutting edge, measured in a side view with radial viewing direction at the outer circumferential-side-cutting-edge corner with respect to the axis of rotation has an angle of twist which lies in a range from 15° to 55°.

14. The conical countersink according to claim 1, wherein the at least one main cutting edge, measured in a side view with radial viewing direction at the outer circumferential-side-cutting-edge corner with respect to the axis of rotation has an angle of twist which lies in a range from 25° to 45°.

15. The conical countersink according to claim 1, wherein:
   a diameter of the conical countersink lies in the range from 4.3 mm to 31 mm and
   the at least one main cutting edge runs along an arc, which when seen in a front view, is defined by a central cutting-edge corner and an outer circumferential-side cutting-edge corner and has a radius in the range from 4 mm to 40 mm.

16. The conical countersink according to claim 1, wherein:
   a diameter of the conical countersink lies in the range from 4 3 mm to 31 mm and
   the at least one main cutting edge runs along an arc, which when seen in a front view, is defined by a central cutting-edge corner and an outer circumferential-side cutting-edge corner and has a radius in the range from 7 mm to 25 mm.

17. The conical countersink according to claim 1, wherein the conical countersink comprises three main cutting edges running in an arcuate shape.

18. The conical countersink according to claim 1, wherein the conical countersink comprises a plurality of main cutting edges running in a spiral shape.

19. The conical countersink according to claim 1, wherein the conical countersink comprises three main cutting edges running in a spiral shape.

20. A conical countersink, comprising:
   a clamping shaft; and
   a cutting head,
   the cutting head comprising a one-piece unitary structure comprising a plurality of main cutting edges,
   a first main cutting edge of the plurality of main cutting edges comprising an arc shape extending from a central cutting-edge corner to an outer-circumferential-side cutting-edge corner,
   wherein viewable in an axial direction from beyond the cutting head are the plurality of main cutting edges, each main cutting edge along a side of a corresponding main free surface, and each main free surface sharing an edge with a surface that defines a boundary of a corresponding clamping groove.

21. The conical countersink according to claim 20, wherein the first main cutting edge extends in an arc shape from the central cutting-edge corner to the outer-circumferential-side cutting-edge corner.

* * * * *